(12) United States Patent
Song et al.

(10) Patent No.: US 11,909,693 B2
(45) Date of Patent: *Feb. 20, 2024

(54) CHANNEL STATE INFORMATION REPORT TRANSMISSION METHOD AND TERMINAL

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Chang'An Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/982,797

(22) Filed: Nov. 8, 2022

(65) Prior Publication Data

US 2023/0066916 A1 Mar. 2, 2023

Related U.S. Application Data

(63) Continuation of application No. 16/969,169, filed as application No. PCT/CN2019/071312 on Jan. 11, 2019, now Pat. No. 11,528,116.

(30) Foreign Application Priority Data

Feb. 12, 2018 (CN) .......................... 201810147620.6

(51) Int. Cl.
  *H04L 5/00* (2006.01)
  *H04W 72/0446* (2023.01)
  *H04L 5/02* (2006.01)

(52) U.S. Cl.
  CPC ....... *H04L 5/0057* (2013.01); *H04W 72/0446* (2013.01); *H04L 5/001* (2013.01); *H04L 5/023* (2013.01)

(58) Field of Classification Search
  CPC .......................... H04L 5/0057; H04W 72/0446
  See application file for complete search history.

(56) References Cited

U.S. PATENT DOCUMENTS

| | | | |
|---|---|---|---|
| 9,369,234 B2 | 6/2016 | Damnjanovic et al. | |
| 2012/0039252 A1* | 2/2012 | Damnjanovic | H04L 5/0057 370/328 |

(Continued)

FOREIGN PATENT DOCUMENTS

| | | |
|---|---|---|
| CN | 102065560 A | 5/2011 |
| CN | 102264130 A | 11/2011 |

(Continued)

OTHER PUBLICATIONS

Ericsson., "Offline session notes for joint MIMO&UL control and CSI reporting session," 3GPP TSG RAN WG1 Meeting AH 1801, R1-1801167, pp. 1-7, (Jan. 22-26, 2018).
Ericsson., "Summary of CSI reporting v3," 3GPP TSG RAN WG1 Meeting AH 1801, R1-1801069, pp. 1-10, (Jan. 24, 2018).
Nokia, et al., "Remaining details for CSI reporting on Pucch," 3GPP TSG RAN WG1 Meeting AH 1801, R1-1800744, pp. 1-5, (Jan. 26, 2018).

(Continued)

*Primary Examiner* — Kevin C. Harper
(74) *Attorney, Agent, or Firm* — Maschoff Brennan

(57) ABSTRACT

The present disclosure provides a channel state information report transmission method and a terminal. The channel state information report transmission method includes: obtaining an allocation rule of a channel state information (CSI) report transmitted on a physical uplink control channel (PUCCH), where the allocation rule is configured by a network device or predefined in a protocol; when there is a collision between at least two CSI reports, allocating some or all of CSI reports with collisions to a first CSI PUCCH according to the allocation rule; transmitting the some or all of CSI reports with collisions. The first CSI PUCCH is configured to transmit the some or all of CSI reports with collisions.

15 Claims, 2 Drawing Sheets

(56) References Cited

U.S. PATENT DOCUMENTS

| | | |
|---|---|---|
| 2013/0089064 A1 | 4/2013 | Ding et al. |
| 2013/0114455 A1 | 5/2013 | Yoo et al. |
| 2013/0148613 A1 | 6/2013 | Han et al. |
| 2013/0286991 A1 | 10/2013 | Yang et al. |
| 2013/0322376 A1 | 12/2013 | Marinier et al. |
| 2013/0336214 A1 | 12/2013 | Sayana et al. |
| 2015/0139101 A1 | 5/2015 | Guo et al. |
| 2019/0223036 A1 | 7/2019 | Lunttila et al. |
| 2019/0261391 A1 | 8/2019 | Kundu et al. |
| 2021/0037526 A1 | 2/2021 | Takeda et al. |

FOREIGN PATENT DOCUMENTS

| | | |
|---|---|---|
| CN | 102291218 A | 12/2011 |
| CN | 102378385 A | 3/2012 |
| CN | 102594527 A | 7/2012 |
| CN | 103026647 A | 4/2013 |
| CN | 103580818 A | 2/2014 |
| CN | 103918334 A | 7/2014 |
| CN | 106998239 A | 8/2017 |
| EP | 3 512 146 A1 | 7/2019 |
| JP | 2015-524229 A | 8/2015 |
| KR | 10-2015-0027194 A | 3/2015 |
| WO | 2019/159245 A1 | 1/2021 |

OTHER PUBLICATIONS

Vivo., "Remaining issues on CSI reporting," 3GPP TSG RAN WG1 Meeting #92, R1-1801519, pp. 1-10, (Feb. 26-Mar. 2, 2018).

Huawei, et al., "Handling of PUCCH transmission with partial overlap," 3GPP TSG RAN WG1 Meeting #92, R1-1802690, pp. 1-9, (Feb. 26-Mar. 2, 2018).

CATT., "Corrections to UCI feedback procedures," 3GPP TSG RAN WG1 Meeting #94, R1-1809713, pp. 1-20, (Aug. 20-24, 2018).

CN Office Action dated Apr. 9, 2020 as received in Application No. 201810147620.6.

International Search Report and Written Opinion of the International Searching Authority dated Aug. 27, 2020 as received in Application No. PCT/CN2019/071312.

Extended European Search Report dated Mar. 3, 2021 as received in Application No. 19750345.1.

IN Patent Examination Report dated Sep. 10, 2021 as received in Application No. 202027038597.

JP Office Action dated Oct. 19, 2021 as received in Application No. 2020-564992.

U.S. Non-Final Office Action dated Dec. 24, 2021 as received in U.S. Appl. No. 16/969,169.

EP Office Action dated Feb. 1, 2023 as received in Application No. 19750345.1.

\* cited by examiner

CHANNEL STATE INFORMATION REPORT TRANSMISSION METHOD AND TERMINAL

CROSS-REFERENCE TO RELATED APPLICATION

This application is a continuation of U.S. patent application Ser. No. 16/969,169 which is the U.S. national phase of PCT Application PCT/CN2019/071312 filed on Jan. 11, 2019, which claims the benefit and priority of Chinese Application No. 201810147620.6, filed on Feb. 12, 2018, which are incorporated herein by reference in their entirety.

TECHNICAL FIELD

The present disclosure relates to the field of communication technologies, and in particular to a channel state information report transmission method and a terminal.

BACKGROUND

Generally, a channel state information (Channel State Information, CSI) report may be configured as follows:
(1) Periodic (Persistent CSI (P-CSI): transmitted only on physical uplink control channel (Physical Uplink Control Channel, PUCCH);
(2) Semi-persistent CSI (Semi-Persistent CSI, SP-CSI): transmitted on PUCCH or physical uplink shared channel (Physical Uplink Shared Channel, PUSCH);
(3) Aperiodic CSI Report (AP-CSI): transmitted only on PUSCH.

Priority rules: when PUCCH resources used by two CSI reports on the same carrier have at least one orthogonal frequency division multiplexing (Orthogonal Frequency Division Multiplexing, OFDM) symbol overlapping in the time domain, the two CSI reports collide. Each CSI report is corresponding to a priority value. In case of CSI report collision or limited uplink transmission resources, a terminal does not transmit a certain CSI report with a high (or low) priority value.

Therefore, in the related art, when multiple PUCCH-based CSI reports collide, they may be dropped according to priorities of various CSI reports, which may cause a network device to fail to obtain some CSI reports in time or missing CSI reports.

SUMMARY

Embodiments of the present disclosure provide a channel state information report transmission method and a terminal.

According to a first aspect, one embodiment of the present disclosure provides a channel state information report transmission method, including:
determining at least two channel state information (CSI) reports transmitted on a physical uplink control channel (PUCCH);
when the at least two CSI reports collide, obtaining a first CSI PUCCH with a smallest resource size that can accommodate resources required by the at least two CSI reports;
if the first CSI PUCCH is obtained successfully, multiplexing all the at least two CSI reports to the obtained first CSI PUCCH;
if the first CSI PUCCH is not obtained successfully, according to priorities, multiplexing the partial of at least two CSI reports to a first CSI PUCCH with a largest resource size;
transmitting the CSI reports on the first CSI PUCCH.

According to a second aspect, one embodiment of the present disclosure provides a terminal, including: a processor, a memory, and a computer program stored on the memory and executable on the processor; wherein the computer program is executed by the processor to
determine at least two channel state information (CSI) reports transmitted on a physical uplink control channel (PUCCH);
when the at least two CSI reports collide, obtain a first CSI PUCCH with a smallest resource size that can accommodate resources required by the at least two CSI reports;
if the first CSI PUCCH is obtained successfully, multiplex all the at least two CSI reports to the obtained first CSI PUCCH;
if the first CSI PUCCH is not obtained successfully, according to priorities, multiplex the partial of at least two CSI reports to a first CSI PUCCH with a largest resource size;
transmit the CSI reports on the first CSI PUCCH.

According to a third aspect, one embodiment of the present disclosure provides a non-transitory computer-readable storage medium, wherein the computer-readable storage medium stores a computer program, and when the computer program is executed by a processor, the following steps are implemented:
determining at least two channel state information (CSI) reports transmitted on a physical uplink control channel (PUCCH);
when the at least two CSI reports collide, obtaining a first CSI PUCCH with a smallest resource size that can accommodate resources required by the at least two CSI reports;
if the first CSI PUCCH is obtained successfully, multiplexing all the at least two CSI reports to the obtained first CSI PUCCH;
if the first CSI PUCCH is not obtained successfully, according to priorities, multiplexing the partial of at least two CSI reports to a first CSI PUCCH with a largest resource size;
transmitting the CSI reports on the first CSI PUCCH.

DETAILED DESCRIPTION

Figure 1:
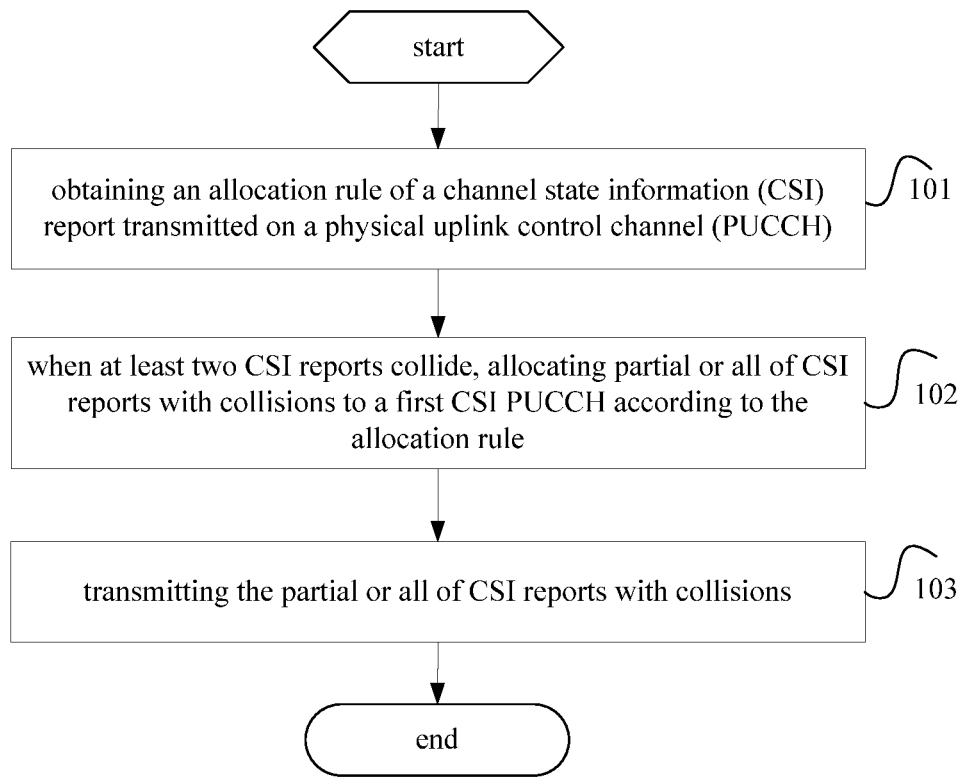
FIG. 1 is a flowchart of a channel state information report transmission method according to an embodiment of the present disclosure.

In order to make the objects, the technical solutions and the advantages of the present disclosure more apparent, the present disclosure will be described hereinafter in a clear and complete manner in conjunction with the drawings and embodiments.

The related technologies of the present disclosure will be briefly described below.

When PUCCH resources used by two CSI reports on the same carrier have at least one orthogonal frequency division multiplexing (OFDM) symbol overlapping in the time domain, the two CSI reports collide. Each CSI report is corresponding to a priority. In case of CSI report collision or limited uplink transmission resources, a terminal does not transmit a certain CSI report with a low priority. For example, for CSI priorities, priorities are determined according to a rule 1 firstly; if priorities obtained according to the rule 1 are equal, then priorities are determined according to a rule 2, and so on.

Rule 1: according to time domain behavior/channel type (AP-CSI>SP-CSI on PUSCH>SP-CSI on PUCCH>P-CSI);

Rules 2 to 4 apply only to P-CSI and SP-CSI based on PUCCH transmission;

Rule 2: CSI content (Beam reports>CSI);

Rule 3: cell ID (PCell>PSCell>other cell IDs in ascending order);

Rule 4: csiReportID (in ascending order).

The CSI reports are divided into Type I and Type II.

(1) CSI report of Type I is divided into at most two parts:

Part 1 includes a rand indicator (Rand Indicator, RI)/channel state information reference signal resource indicator (Channel State Information Reference Signal Resource Indicator, CRI), and a channel quality indicator (Channel Quality Indicator, CQI) of a first codeword;

Part 2 includes a precoding matrix indicator (Precoding Matrix Indicator, PMI) and a CQI of a second codeword when RI>4.

(2) CSI report of Type II is divided into at most two parts:

Part 1 has a fixed payload length for indicating a bit length of Part 2, and includes RI, CQI, and the number of non-zero wideband amplitude coefficients per layer;

Part 2 includes PMI of Type II.

In addition to the CSI reports of type I and Type II, there are beam information reports for beam management, such as "CRI/RSRP (reference signal received power)" and "SSBRI/RSRP", at this point, the CSI report has only one part.

The NR supports configuration of J>=1 first CSI PUCCH (or, referred to as multiple CSI PUCCH, multi-CSI PUCCH) resources for a user equipment (User Equipment, UE) on each band width part (Band Width Part, BWP) to carry multiple PUCCH-based CSI reports. The configuration of the PUCCH resources includes PUCCH Format 2/3/4 and a maximum bit rate. When two or more PUCCH-based CSI reports collide, the UE transmits partial or all of high-priority CSI reports on the multi-CSI PUCCH, and drops other CSI reports. The number of CSI reports that can be transmitted may be determined by the bit rate configured for the multi-CSI PUCCH.

Therefore, the network device may configure one or more first CSI PUCCHs that each may carry multiple CSI reports; multiple PUCCH-based CSI reports that collided, may be transmitted on the first CSI PUCCH, rather than simply dropped.

Embodiments of the present disclosure provide a channel state information report transmission method and a terminal, which can solve the problem that the network device fails to obtain CSI reports in time or misses CSI reports caused by dropping CSI reports when multiple PUCCH-based CSI reports collide.

Specifically, as shown in FIG. 1, a channel state information report transmission method according to an embodiment of the present disclosure is applied to a terminal and includes:

Step 101: obtaining an allocation rule of a channel state information (CSI) report transmitted on a physical uplink control channel (PUCCH), where the allocation rule is configured by a network device or predefined in a protocol;

Step 102: when at least two CSI reports collide, multiplexing partial or all of CSI reports with collisions to a first CSI PUCCH according to the allocation rule;

Step 103: transmitting the partial or all of CSI reports with collisions;

where the first CSI PUCCH is configured to transmit partial or all of the CSI reports with collisions (i.e., the first CSI PUCCH refers to the above multi-CSI PUCCH).

In the channel state information report transmission method according to an embodiment of the present disclosure, the allocation rule of CSI reports transmitted on PUCCH is obtained; when at least two CSI reports collide, partial or all of CSI reports with collisions are multiplexed to the first CSI PUCCH according to the allocation rule; and the partial or all of the CSI reports with collisions are transmitted. In this way, according to the allocation rule, the method can correctly multiplex multiple PUCCH-based CSI reports with collisions to at least one of multiple multi-CSI PUCCHs configured by the network device, rather than simply transmitting one high-priority CSI report and dropping other low-priority CSI reports according to priorities of various CSI reports, thereby preventing the network device from failing to obtain some CSI reports in time or missing some CSI reports to a certain extent. Thus, the method can solve the problem in the related art that the network device fails to obtain CSI reports in time or misses CSI reports caused by dropping CSI reports when multiple PUCCH-based CSI reports collide, thereby ensuring the reliability of network communication.

Specifically, the multiplexing partial or all of CSI reports with collisions to a first CSI PUCCH according to the allocation rule, includes:

according to configured J first CSI PUCCHs, determining available maximum N first CSI PUCCHs;

selecting M first CSI PUCCHs from the configured J first CSI PUCCHs;

multiplexing partial or all of CSI reports with collisions to selected M first CSI PUCCHs; where J is an integer greater than or equal to 1, N is an integer which is greater than or equal to 1 and less than or equal to J, M is an integer greater which is greater than or equal to 1 and less than or equal to N, and at least one of J, N and M is configured by the network device or predefined in a protocol.

The allocation rule is that, when at least two first CSI PUCCHs are configured for the terminal in the same preset time period, at least one first CSI PUCCH is selected so that partial or all of CSI reports with collisions are multiplexed to the selected at least one first CSI PUCCH.

Specifically, the preset time period may be one slot.

For the same or different resource sizes of the J first CSI PUCCHs configured for the terminal, one embodiment of the present disclosure provides the following two examples.

According to a first example in which when resource sizes of the J first CSI PUCCHs configured for the terminal are the same, the multiplexing partial or all of CSI reports with collisions to the selected M first CSI PUCCHs, includes: multiplexing the at least two CSI reports with collisions to the selected M first CSI PUCCHs in descending order of priorities of each CSI report in the at least two CSI reports with collisions, until the at least two CSI reports with collisions have been multiplexed or until the selected M first CSI PUCCHs have been fully occupied.

Specifically, time domain resources of the J first CSI PUCCHs configured for the terminal are different, that is, the multiple first CSI PUCCHs occupy different time domain OFDM symbols. The same resource size means that the number of REs occupied by any two first CSI PUCCHs is the same, that is, the product of the number of occupied OFDM symbols and the number of frequency domain subcarriers is the same.

According to a second example in which when resource sizes of at least two first CSI PUCCHs configured for the terminal are different, the selecting M first CSI PUCCHs from the configured J first CSI PUCCHs, includes:

obtaining M first CSI PUCCHs that meet resources required by at least two CSI reports with collisions from the configured J first CSI PUCCHs, in such a manner that a sum of resource sizes of the M first CSI PUCCHs is greater than the resources required by the at least two CSI reports with collisions and is closest to the resources required by the at least two CSI reports with collisions, and a value of the M is the smallest.

Specifically, time domain resources of the J first CSI PUCCHs configured for the terminal are different, that is, the multiple first CSI PUCCHs occupy different time domain OFDM symbols. Different resource sizes mean that the number of REs occupied by any two first CSI PUCCHs is different, that is, the product of the number of occupied OFDM symbols and the number of frequency domain subcarriers is different.

Correspondingly, the multiplexing partial or all of CSI reports with collisions to the selected M first CSI PUCCHs, includes:

according to CSI report priorities, arranging the at least two CSI reports with collisions in descending order to obtain a first order; according to resource sizes of obtained M first CSI PUCCHs, arranging the obtained M first CSI PUCCHs in descending order to obtain a second order;

according to the first order, sequentially multiplexing the at least two CSI reports with collisions to the M first CSI PUCCHs which are arranged in the second order, until the at least two CSI reports have been multiplexed or until the first CSI PUCCHs have been fully occupied.

That is, a first one of the first CSI PUCCHs may be optionally occupied; when the first one of the first CSI PUCCHs cannot accommodate the at least two CSI reports, a second one of the first CSI PUCCHs will be occupied. Among the at least two CSI reports, the CSI report with high priority shall be multiplexed first, until the at least two CSI reports have been multiplexed or the selected M first CSI PUCCHs are filled (occupied).

In other words, solutions of one embodiment of the present disclosure may include:

assuming that the network device may configure J first CSI PUCCH resources, but at most N≥1 first CSI PUCCHs can be used for transmission in a slot; resources (time domain) of the configured J first CSI PUCCHs are different, and resource sizes are the same or different; the number of CSI reports with collisions is K;

according to a preset rule (which may be configured by the network device), multiplexing X CSI reports (X is greater than or equal to 1 and less than or equal to K) that can be transmitted to M (1≤M≤N) first CSI PUCCHs;

when resource sizes of the J first CSI PUCCHs are different, selecting multiple first CSI PUCCH resources that minimize M with a sum of resources of the M first CSI PUCCHs being closest to resources required by the K CSI reports. Specifically, the K CSI reports with collisions are arranged (i.e., by priority).

(1) First, finding a first CSI PUCCH with a smallest resource size that can accommodate resources required by the K CSI reports. If such a first CSI PUCCH can be found, M=1; otherwise, according to orders of the CSI reports, multiplexing CSI reports to a first CSI PUCCH with a largest resource size. It is assumed that the first CSI PUCCH with the largest resource size can accommodate X1 (X1<K) CSI reports; if N=1, M=N, then ending; otherwise, performing (2).

(2) Continuing to find a first CSI PUCCH with a smallest resource size that can accommodate resources required by remaining (K−X1) CSI reports. If such a first CSI PUCCH can be found, M=2, and ending; otherwise, according to orders of the CSI reports, multiplexing CSI reports to a first CSI PUCCH with a largest resource size among the remaining first CSI PUCCHs. It is assumed that the first CSI PUCCH with the largest resource size among the remaining first CSI PUCCHs can accommodate X2 (X2<K−X1) CSI reports; if N=2, M=N, then ending; otherwise, performing (3).

(3) multiplexing the remaining (K−X1−X2) CSI reports in the same way until the K CSI reports have been multiplexed or the N first CSI PUCCH have been fully occupied (i.e., M=N).

Further, before multiplexing partial or all of CSI reports with collisions to a first CSI PUCCH, the method further includes: obtaining a period of the first CSI PUCCH; where the period is indicated by the network device or the period is determined by the terminal according to a lowest common multiple of periods of the at least two CSI reports.

When the period is indicated by the network device, a value of the period is determined according to a minimum value of periods in preset information configured by radio resource control (RRC) for the at least two CSI reports; or, the value of the period is determined by the network device according to the lowest common multiple of periods of the at least two CSI reports.

The preset information includes: periodic CSI report setting information or semi-persistent CSI report setting information.

Further, the multiplexing partial or all of CSI reports with collisions to a first CSI PUCCH according to the allocation rule, includes: according to the period and the allocation rule, multiplexing partial or all of CSI reports with collisions to the first CSI PUCCH.

It should be noted that in one embodiment of the present disclosure, the period of the multi-CSI PUCCH may be explicitly configured or implicitly acquired by the RRC or medium access control control element (MAC CE).

(1) Explicit configuration (1-1) the period of the multi-CSI PUCCH is determined by a minimum period value of all P-CSI report settings or SP-CSI report settings configured by RRC.

1-2) Implicit acquisition (1-2-1) the period of the multi-CSI PUCCH is determined according to a lowest common multiple of periods of various PUCCH-based CSI reports with collisions.

In one embodiment of the present disclosure, the period may not be configured, as long as a collision between PUCCH-based CSI reports occurs, multi-CSI PUCCH may be used (the collision is likely to be non-uniform).

In one embodiment of the present disclosure, the first CSI PUCCHs may include a plurality of first CSI PUCCHs with different periods.

Considering the behavior when the first CSI PUCCH collides with PUCCH, PUSCH or SRS, in one embodiment of the present disclosure, when transmitting the partial or all of CSI reports with collisions, the method further includes at least one of the following steps:

when the first CSI PUCCH and PUCCH carrying hybrid automatic repeat request acknowledgment (HARQ-ACK) collide, transmitting the HARQ-ACK on the first CSI PUCCH;

when the first CSI PUCCH and physical uplink shared channel (PUSCH) collide, transmitting CSI reports of the first CSI PUCCH on the PUSCH (that is, the multi-CSI PUCCH is piggybacked onto the PUSCH for transmission);

when the first CSI PUCCH and sounding reference signal (Sounding Reference Signal, SRS) collide, determining to transmit the first CSI PUCCH or the SRS, according to information carried by the first CSI PUCCH, periodicity characteristics of the first CSI PUCCH and periodicity characteristics of the SRS.

In other words, in one embodiment of the present disclosure, the method also defines the behavior when multi-CSI PUCCH collides with PUCCH, PUSCH or SRS. When transmitting the multi-CSI PUCCH, (1) when the multi-CSI PUCCH collides with PUCCH carrying hybrid automatic repeat request acknowledgment (Hybrid Automatic Repeat request Acknowledgment, HARQ-ACK), HARQ-ACK information is transmitted on the multi-CSI PUCCH;

(2) when the multi-CSI PUCCH collides with physical uplink shared channel (PUSCH), the multi-CSI PUCCH is piggybacked onto the PUSCH for transmission;

(3) when the multi-CSI PUCCH collides with sounding reference signal (SRS), it is processed according to the multiplexing principle of PUCCH and SRS (determined according to information carried by PUCCH, periodicity characteristics of PUCCH and periodicity characteristics of the SRS).

In order to improve resource utilization, the first CSI PUCCH is used when CSI reports transmitted on PUCCH collide. When CSI reports transmitted on the PUCCH do not collide, the resources occupied by the first CSI PUCCH are allocated to PUSCH, SRS, or other PUCCH except for the first CSI PUCCH.

That is, the multi-CSI PUCCH is used only when the PUCCH-based CSI reports collide; and the resources occupied by the multi-CSI PUCCH can be allocated to other PUCCH, PUSCH or SRS when the PUCCH-based CSI reports do not collide.

Specifically, in one embodiment of the present disclosure, encoding modes of the at least two CSI reports with collisions include at least one of the following modes:

the at least two CSI reports with collisions are separately encoded in the first CSI PUCCH;

the first parts of the at least two CSI reports with collisions are jointly encoded, and the second parts of the at least two CSI reports with collisions are jointly encoded.

In other words, in one embodiment of the present disclosure, an encoding scheme of the at least two CSI reports (which, specifically, refer to CSI reports that can be transmitted) may be one of the following modes.

(1) encoding schemes of all CSI reports that can be transmitted is still the same as encoding schemes of respective original PUCCHs.

The same as the encoding schemes of respective original PUCCHs specifically means that the CSI part 1 and the CSI part 2 (if any) are encoded separately, and 3 bit<CSI part 1 or CSI part 2<11 bit with RM code; CSI part 1 or CSI part 2>11 bit with polar code.

(2) The CSI part 1 of all the CSI reports that can be transmitted is jointly encoded according to the rules in the related art, and the CSI part 2 is jointly encoded according to the rules in the related art.

The rules in the related art mean that CSI part 1 and CSI part 2 (if any) are encoded, respectively, and 3 bit<CSI part 1 or CSI part 2<11 bit with RM code; CSI part 1 or CSI part2>11 bit with polar code.

As can be seen from the above that the solutions provided in the embodiments of the present disclosure describe some implementation details of the introduced multi-CSI PUCCH, and can ensure the reliability of network communication.

Figure 2:
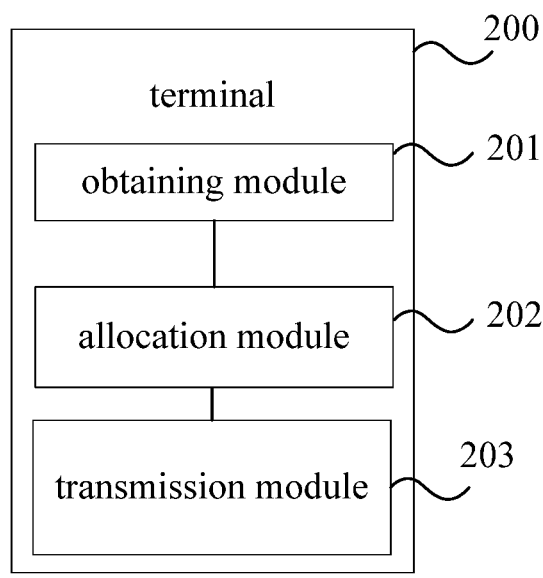
FIG. 2 is a block diagram of a terminal according to an embodiment of the present disclosure.

As shown in FIG. 2, one embodiment of the present disclosure provides a terminal 200, including:

an obtaining module 201 configured to obtain an allocation rule of a channel state information (CSI) report transmitted on a physical uplink control channel (PUCCH), where the allocation rule is configured by a network device or predefined in a protocol;

an allocation module 202 configured to, when at least two CSI reports collide, multiplex partial or all of CSI reports with collisions to a first CSI PUCCH according to the allocation rule;

a transmission module 203 configured to transmit partial or all of the CSI reports with collisions;

where the first CSI PUCCH is used to transmit partial or all of the CSI reports with collisions.

Specifically, the allocation module 202 includes:

a determining unit configured to, according to configured J first CSI PUCCHs, determine available maximum N first CSI PUCCHs;

a selecting unit configured to select M first CSI PUCCHs from the configured J first CSI PUCCHs;

an allocation unit configured to multiplex partial or all of CSI reports with collisions to selected M first CSI PUCCHs;

where J is an integer greater than or equal to 1, N is an integer which is greater than or equal to 1 and less than or equal to J, M is an integer greater which is greater than or equal to 1 and less than or equal to N, and at least one of J, N and M is configured by the network device or predefined in a protocol.

Optionally, the allocation rule is that, when at least two first CSI PUCCHs are configured for the terminal in the same preset time period, at least one first CSI PUCCH is selected so that partial or all of CSI reports with collisions are multiplexed to the selected at least one first CSI PUCCH.

Further, when resource sizes of the J first CSI PUCCHs configured for the terminal are the same, the selecting unit is configured to, multiplex the at least two CSI reports with collisions to the selected M first CSI PUCCHs in descending order of priorities of each CSI report in the at least two CSI reports with collisions, until the at least two CSI reports have been allocated or until the selected M first CSI PUCCHs have been fully occupied.

Optionally, when resource sizes of at least two first CSI PUCCHs configured for the terminal are different, the selecting unit is configured to, obtain M first CSI PUCCHs that meet resources required by at least two CSI reports with collisions from the configured J first CSI PUCCHs, in such a manner that a sum of resource sizes of the M first CSI PUCCHs is greater than the resources required by the at least two CSI reports with collisions and is closest to the resources required by the at least two CSI reports with collisions, and a value of the M is the smallest.

Specifically, the allocation unit is configured to, according to CSI report priorities, arrange the at least two CSI reports with collisions in descending order to obtain a first order;

according to resource sizes of obtained M first CSI PUCCHs, arrange the obtained M first CSI PUCCHs in descending order to obtain a second order;

according to the first order, sequentially multiplex the at least two CSI reports with collisions to the M first CSI PUCCHs which are arranged in the second order, until the at least two CSI reports have been multiplexed or until the first CSI PUCCHs have been fully occupied.

Optionally, the terminal further includes:

a period obtaining module configured to obtain a period of the first CSI PUCCH;

where the period is indicated by the network device or the period is determined by the terminal according to a lowest common multiple of periods of the at least two CSI reports.

When the period is indicated by the network device, a value of the period is determined according to a minimum value of a period of preset information of the at least two CSI reports configured by radio resource control (RRC); or, the value of the period is determined by the network device according to the lowest common multiple of periods of the at least two CSI reports.

The preset information includes: periodic CSI report setting information or semi-persistent CSI report setting information.

Further, the allocation module is configured to, according to the period and the allocation rule, multiplex partial or all of CSI reports with collisions to the first CSI PUCCH.

Specifically, the first CSI PUCCHs include a plurality of first CSI PUCCHs with different periods.

Further, when transmitting the partial or all of CSI reports with collisions, the terminal further includes at least one of the following modules:

a first execution module configured to, when the first CSI PUCCH and PUCCH carrying hybrid automatic repeat request acknowledgment (HARQ-ACK) collide, transmit the HARQ-ACK on the first CSI PUCCH;

a second execution module configured to, when the first CSI PUCCH and physical uplink shared channel (PUSCH) collide, transmit CSI reports of the first CSI PUCCH on the PUSCH;

a third execution module configured to, when the first CSI PUCCH and sounding reference signal (SRS) collide, determine to transmit the first CSI PUCCH or the SRS, according to information carried by the first CSI PUCCH, periodicity characteristics of the first CSI PUCCH and periodicity characteristics of the SRS.

Specifically, encoding modes of the at least two CSI reports with collisions include at least one of the following modes:

the at least two CSI reports with collisions are separately encoded in the first CSI PUCCH;

the first parts of the at least two CSI reports with collisions are jointly encoded, and the second parts of the at least two CSI reports are jointly encoded.

Specifically, the first CSI PUCCH is used only when the CSI reports transmitted on PUCCH collide; and the resources occupied by the first CSI PUCCH can be allocated to PUSCH, SRS or other PUCCH except for the first CSI PUCCH when the CSI reports transmitted on PUCCH does not collide.

It should be noted that this terminal embodiment refers to a terminal corresponding to the foregoing channel state information report transmission method applied to the terminal, and all implementation manners of the foregoing embodiments are applicable to this terminal embodiment and can also achieve the same technical effects.

Figure 3:
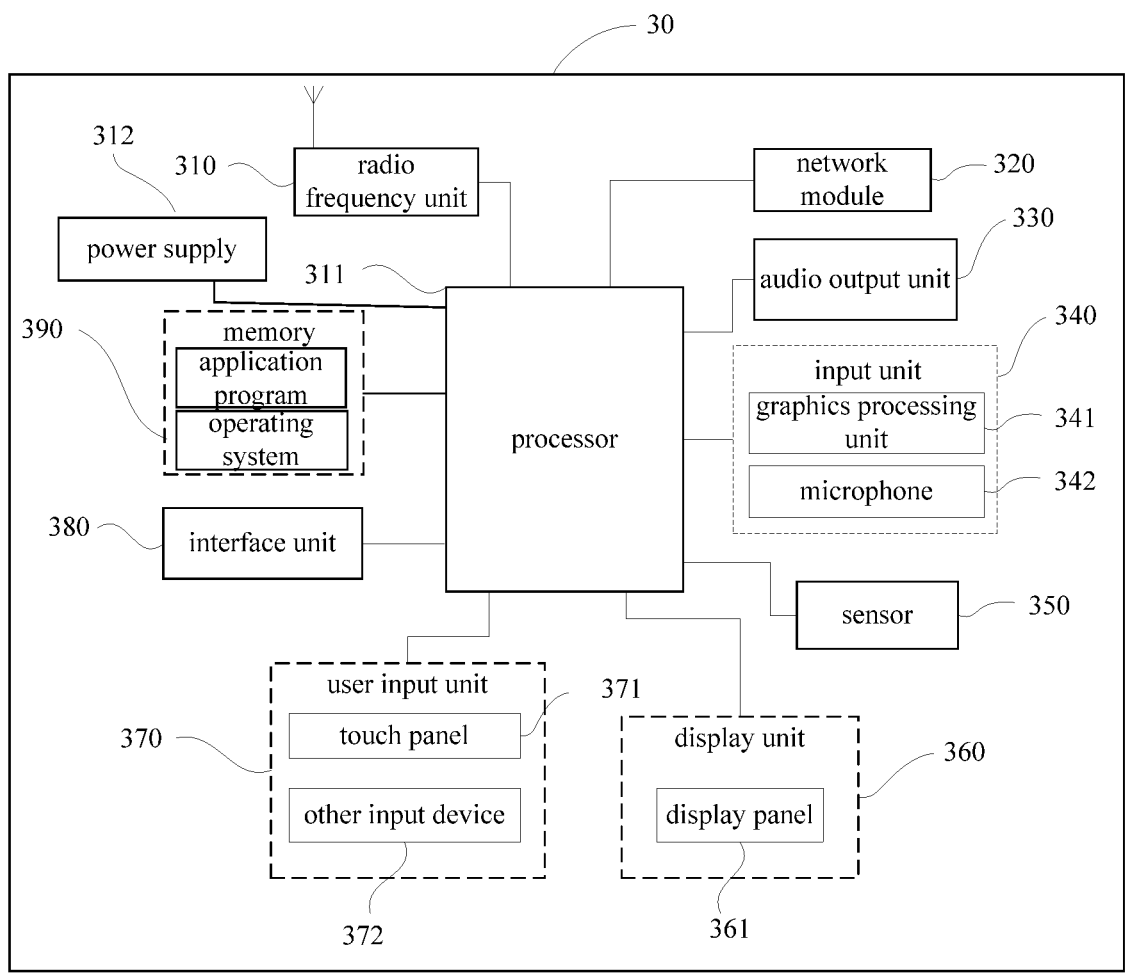
FIG. 3 is a schematic diagram of a terminal according to an embodiment of the present disclosure.

FIG. 3 is a schematic diagram of a hardware structure of a terminal according to an embodiment of the present disclosure.

The terminal 30 includes, but is not limited to, a radio frequency unit 310, a network module 320, an audio output unit 330, an input unit 340, a sensor 350, a display unit 360, a user input unit 370, an interface unit 380, a memory 390, a processor 311, and a power supply 312. It will be appreciated by those skilled in the art that structures of the terminal shown in FIG. 3 do not constitute a definition of a terminal, which may include more or fewer components than illustrated, or have some components combined, or different component arrangements. In one embodiment of the present disclosure, the terminal includes, but is not limited to, a mobile phone, a tablet computer, a notebook computer, a palmtop computer, an in-vehicle terminal, a wearable device, a pedometer, and the like.

The processor 311 is configured to, obtain an allocation rule of a channel state information (CSI) report transmitted on a physical uplink control channel (PUCCH), where the allocation rule is configured by a network device or predefined in a protocol;

when at least two CSI reports collide, multiplexing partial or all of CSI reports with collisions to a first CSI PUCCH according to the allocation rule;

transmit the partial or all of CSI reports with collisions;

where the first CSI PUCCH is used to transmit partial or all of CSI reports with collisions.

In the terminal according to an embodiment of the present disclosure, the allocation rule of CSI reports transmitted on PUCCH is obtained; when at least two CSI reports collide, partial or all of CSI reports with collisions are multiplexed to the first CSI PUCCH according to the allocation rule; and the partial or all of CSI reports with collisions are transmitted. In this way, according to the allocation rule, the terminal can correctly multiplex multiple PUCCH-based CSI reports with collisions to at least one of multiple multi-CSI PUCCHs configured by the network device, rather than simply dropping CSI reports according to priorities of various CSI reports, thereby preventing the network device from failing to obtain some CSI reports in time or missing some CSI reports to a certain extent. Thus, the terminal can solve the problem in the related art that the network device fails to obtain CSI reports in time or misses CSI reports caused by dropping CSI reports when multiple PUCCH-based CSI reports collide, thereby ensuring the reliability of network communication.

It should be understood that in some embodiments of the present disclosure, the radio frequency unit 310 may be used to receive and transmit signals during receiving and transmitting information or a call. Specifically, the radio frequency unit 310 receives downlink data from a base station and then transmits the downlink data to the processor 311 for processing. Uplink data is transmitted to the base station. Generally, the radio frequency unit 310 includes, but is not limited to, an antenna, at least one amplifier, a transceiver, a coupler, a low noise amplifier, a duplexer, and the like. In addition, the radio frequency unit 310 may also communicate with the network and other devices through a wireless communication system.

The terminal provides wireless broadband internet access to the user through the network module 320, such as assisting the user in receiving and transmitting email, browsing web pages, and accessing streaming media.

The audio output unit 330 may convert the audio data received by the radio frequency unit 310 or the network module 320 or stored in the memory 390 into an audio signal and output as sound. Moreover, the audio output unit 330 may also provide audio output (e.g., call signal reception sound, message reception sound, etc.) related to a specific function performed by the terminal 30. The audio output unit 330 includes a speaker, a buzzer, a receiver, and the like.

The input unit 340 is used for receiving an audio or video signal. The input unit 340 may include a graphics processing unit (Graphics Processing Unit, GPU) 341 and a microphone 342. The GPU 341 processes image data of static pictures or videos obtained by an image capturing apparatus (such as a camera) in a video capturing mode or an image capturing mode. The processed image frame may be displayed on the display unit 360. The image frames processed by the graphics processor 341 may be stored in the memory 390 (or other storage medium) or transmitted via the radio frequency unit 310 or the network module 320. The microphone 342 can receive sound and can process such sound into audio data. The processed audio data may be converted into a format output that may be transmitted to the mobile communication base station via the radio frequency unit 310 in the case of a telephone talk mode.

The terminal 300 further includes at least one sensor 350, such as a light sensor, a motion sensor, and other sensors. Specifically, the light sensor includes an ambient light sensor and a proximity sensor. The ambient light sensor can adjust brightness of a display panel 361 according to the brightness of the ambient light. The proximity sensor can turn off the display panel 361 and/or backlight when the terminal 30 moves to the ear. As one of the motion sensors, an accelerometer sensor can detect the magnitude of the acceleration in each direction (generally three axes), can detect the magnitude and direction of the gravity when stationary, and can be used to identify the attitude of the terminal (such as horizontal/vertical screen switching, related games, magnetometer attitude calibration), vibration identification related functions (such as pedometer, knocking), and the like. The sensor 350 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 360 is used to display information input by or provided to the user. The display unit 360 may include a display panel 361, which may be configured in the form of a liquid crystal display (Liquid Crystal Display, LCD), an organic light-emitting Diode (Organic Light-Emitting Diode, OLED), or the like.

The user input unit 370 may be used to receive the input number or character information, and to generate a key signal input related to the user setting and the function control of the terminal. Specifically, the user input unit 370 includes a touch panel 371 and other input devices 372. The touch panel 371, also referred to as a touch screen, may collect touch operations on or near the touch panel (e.g., operations on or near the touch panel 371 using any suitable object or accessory, such as a finger, stylus, or the like). The touch panel 371 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 311, receives commands from the processor 311 and execute them. In addition, the touch panel 371 may be implemented in various types such as a resistive type, a capacitive type, an infrared ray, and a surface acoustic wave. In addition to the touch panel 371, the user input unit 370 may further include other input devices 372. Specifically, other input devices 372 may include, but are not limited to, a physical keyboard, a function key (such as a volume control key, an on-off key), a trackball, a mouse, and a joystick, which will not be elaborated herein.

Further, the touch panel 371 may be overlaid on the display panel 361. When the touch panel 371 detects a touch operation on or near the touch panel, the touch panel 371 transmits it to the processor 311 to determine a type of a touch event. Then, the processor 311 provides a corresponding visual output on the display panel 361 according to the type of the touch event. Although in FIG. 3, the touch panel 371 and the display panel 361 are implemented as two separate components to implement the input and output functions of the terminal, in some embodiments, the touch panel 371 and the display panel 361 may be integrated to implement the input and output functions of the terminal, which are not specifically limited herein.

The interface unit 380 is an interface through which an external device is connected to the terminal 30. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 380 may be used to receive input (e.g., data information, power, etc.) from the external device and transmit the received input to one or more elements within the terminal 30 or may be used to transmit data between the terminal 30 and the external device.

The memory 390 may be used to store software programs and various data. The memory 390 may mainly include a program storage area and a data storage area. The program storage area may store an operating system, an application program (such as a sound play function, an image play function) required by at least one function, and the like. The data storage area may store data (such as audio data, a phone book) created according to use of the user terminal. In addition, the memory 390 may include high speed random access memory, and may also include non-volatile memory, such as at least one magnetic disk storage device, flash memory device, or other volatile solid state storage device.

The processor 311 is a control center of the terminal, connects various parts of the entire terminal by various interfaces and lines, executes various functions of the terminal and processes data by running or executing software programs and/or modules stored in the memory 390 and invoking data stored in the memory 390, thereby performing overall monitoring of the terminal. The processor 311 may include one or more processing units. Optionally, the processor 311 may integrate an application processor and a modem processor. The application processor primarily processes the operating system, the user interface and the application program. The modem processor primarily processes wireless communications. It will be appreciated that the modem processor may also not be integrated into the processor 311.

The terminal 30 may further include a power source 312 (such as a battery) that supplies power to the various components. Optionally, the power source 312 may be logically connected to the processor 311 through a power management system to perform functions such as managing charging, discharging, and power consumption management through the power management system.

In addition, the terminal 30 includes functional modules not shown, which will not be elaborated herein.

Optionally, one embodiment of the present disclosure further provides a terminal including a processor 311, a memory 390, and a computer program stored in the memory 390 and executable on the processor 311. When the computer program is executed by the processor 311, each of the processes in the channel state information report transmission method of the above embodiment is implemented, and the same technical effect can be achieved. To avoid repetition, details are not described herein.

One embodiment of the present disclosure further provides a computer readable storage medium including a computer program stored thereon. The computer program is executed by a processor to implement each process of the channel state information report transmission method at the terminal of the above embodiment, and the same technical effect can be achieved. To avoid repetition, details are not described herein. The computer readable storage medium, for example, may be a read-only memory (Read-Only Memory, ROM), a random access memory (Random Access Memory, RAM), a magnetic disk, or an optical disk.

Further, when multiple CSI reports collide, dropping some CSI reports according to the priorities of various CSI reports may cause the network side to fail to obtain some CSI reports in time or miss some CSI reports. When these CSI reports with collisions are transmitted on PUSCH containing larger resources, multiple CSI reports can be transmitted rather than simply dropped.

Generally, a channel state information (CSI) report may be configured as follows:
(1) Periodic CSI (P-CSI): transmitted only on physical uplink control channel (PUCCH);
(2) Semi-persistent CSI (SP-CSI): transmitted on PUCCH or physical uplink shared channel (PUSCH);
(3) Aperiodic CSI Report (AP-CSI): transmitted only on PUSCH.

Priority rules: when PUCCH resources used by two CSI reports on the same carrier have at least one orthogonal frequency division multiplexing (OFDM) symbol overlapping in the time domain, the two CSI reports collide. Each CSI report is corresponding to a priority value. In case of CSI report collision or limited uplink transmission resources, a terminal does not transmit a certain CSI report with a high (or low) priority value.

Rule 1: according to time domain behavior/channel type (AP-CSI>SP-CSI on PUSCH>SP-CSI on PUCCH>P-CSI);

Rules 2 to 4 apply only to P-CSI and SP-CSI based on PUCCH transmission;

Rule 2: CSI content (Beam reports>CSI);

Rule 3: cell ID (PCell>PSCell>other cell IDs in ascending order);

Rule 4: csiReportID (in ascending order).

The CSI reports are divided into Type I and Type II.

(1) CSI report of Type I is divided into at most two parts:

Part 1 includes a rand indicator (RI)/channel state information reference signal resource indicator (CRI), and a channel quality indicator (CQI) of a first codeword;

Part 2 includes a precoding matrix indicator (PMI) and a CQI of a second codeword when RI>4.

(2) CSI report of Type II is divided into at most two parts:

Part 1 has a fixed payload length for indicating a bit length of Part 2, and includes RI, CQI, and the number of non-zero wideband amplitude coefficients per layer;

Part 2 includes PMI of Type II.

In addition to the CSI reports of type I and Type II, there are beam information reports for beam management, such as "CRI/RSRP" and "SSBRI/RSRP", at this point, the CSI report has only one part.

When the CSI report on PUSCH includes two parts (Part 1 and Part 2), the terminal may drop a part of content of the Part 2 without reporting. There are N CSI reports in one slot, where N is the number of CSI reports included in a corresponding configuration report (ReportConfig). When CSI reported on PUSCH and uplink data are transmitted simultaneously, if PUSCH space cannot accommodate complete content of the CSI report, CSI content in the Part 2 is dropped step by step with a dropping priority as follows: priority 0 is the highest priority, i.e., content of the CSI report to be transmitted preferentially; priority 2N is the lowest priority, i.e., content of the CSI report to be dropped first. When dropping, content of a priority layer in the CSI report is dropped as a whole.

When t PUCCH that transmits the CSI report and PUSCH that transmits uplink data collide, the CSI report of the PUCCH may be piggybacked onto the PUSCH for transmission. At this point, an encoding mode of CSI report and a dropping mode of CSI report in PUSCH are the same as original modes in PUCCH.

The protocol in the related art specifies rules about how to allocate resources when CSI reports and uplink data are transmitted on PUSCH, as well as mapping positions of CSI reports.

In the related art, when CSI reports collide, a related processing is described as follows: when the terminal is configured to transmit two CSI reports with collisions, the following rules apply: the terminal does not transmit a CSI report with a higher priority value (which is corresponding to a CSI report with a low priority).

However, in some cases, resources in PUSCH for transmitting CSI reports are larger, more CSI reports can be transmitted rather than simply dropping the CSI reports.

In the following situations, CSI reports will collide and be transmitted on PUSCH:

(1) PUSCH-based AP-CSI report and PUSCH-based SP-CSI report collide;
(2) PUSCH-based AP-CSI report and uplink shared channel (UL-SCH) are transmitted on the same PUSCH;
(3) PUSCH-based SP-CSI report and UL-SCH are transmitted on the same PUSCH;
(4) PUCCH-based P-CSI report or SP-CSI report and PUSCH-based AP-CSI report or SP-CSI report collide;
(5) when PUCCH-based P-CSI report or SP-CSI report and PUSCH for scheduling UL-SCH collide, P-CSI report or SP-CSI report of PUCCH may be piggybacked onto PUSCH for transmission;
(6) PUCCH-based P-CSI report or SP-CSI report and PUSCH including PUSCH-based AP-CSI report or SP-CSI report and UL-SCH collide.

In the related art, when multiple CSI reports (i.e., at least two CSI reports) collide, dropping some CSI reports according to the priorities of various CSI reports may cause the network side to fail to obtain some CSI reports in time or miss some CSI reports. When these CSI reports with collisions are transmitted on PUSCH containing larger resources, multiple CSI reports can be transmitted rather than simply dropped.

When K (K>1) CSI reports (including PUCCH-based CSI report and/or PUSCH-based CSI report, i.e., at least two CSI reports) collide, and a processing mode for transmission on PUSCH includes the following modes.

First Mode

According to the priority rule in the related art, a CSI report with the highest priority among the at least two CSI reports is transmitted, and other CSI reports are dropped. A size of resource for transmitting the CSI report on the PUSCH is determined; according to a preset rule, the CSI report with the highest priority is mapped to corresponding time-frequency position on the PUSCH for transmission.

It should be noted that the preset rule is to prioritize CSI reports according to resource sizes required by the CSI reports, and then map the CSI report with the highest priority to corresponding time-frequency position on the PUSCH.

Second Mode

X (X≤K) high-priority CSI reports are selected and mapped to corresponding time-frequency positions on PUSCH for transmission. That is, in at least two CSI reports with collisions, partial or all of the at least two CSI reports with collisions are selected in a descending order of priories of CSI reports.

Specific implementation mode includes at least one of the following modes:

(1) determining a size of resources required for each CSI report to be transmitted, and determining a size of available resources for transmitting CSI reports on PUSCH, and allocating X (X≤K) CSI reports to the available resources for transmitting CSI reports on PUSCH;

where it should be noted that when the PUCCH-based CSI report is transmitted on PUSCH, the PUCCH-based CSI report is still encoded according to an encoding mode of PUCCH;

(2) multiplexing K high-priority CSI reports to resources allocated by PUSCH to the CSI reports, i.e., multiplexing the K high-priority CSI reports to resources of PUSCH (specifically, according to priority order (priority order of CSI reports) with priority values being determined according to conclusions in the related art). At least one of the following modes can be used for specific implementation.

First mode: each CSI report of low priority (including part 1 and part 2), as a whole, is dropped, until a bit rate of uplink control information (UCI) is less than a bit rate threshold.

A bit rate of each CSI report is calculated and compared with the bit rate threshold. If there is one CSI report with a bit rate greater than the bit rate threshold, a low-priority CSI report is dropped, and so on, until the bit rate of each CSI report that can be transmitted is less than the bit rate threshold.

Second mode: first, according to priorities, determining whether to drop part 1 of one CSI report, and then determining whether to drop part 2. It should be noted that when part 1 of one CSI report is dropped, its corresponding part 2 will also be dropped. If part 1 of one CSI report can be transmitted, the corresponding part 2 may be dropped step by step according to the method in the related art.

Specifically, when dropping part 1, a bit rate of each CSI part 1 is calculated and compared with a bit rate threshold 1. If the bit rate of each CSI part 1 is greater than the bit rate threshold 1, it is necessary to drop the part 1 of a low-priority CSI report until the bit rate of each CSI part 1 that can be transmitted (or, bit rates of all CSI part 1) is less than the bit rate threshold 1.

When dropping part 2, a bit rate of each CSI part 2 corresponding to each CSI part 1 that can be transmitted, is calculated and compared with a bit rate threshold 2. If the bit rate of each CSI part 2 is greater than the bit rate threshold 2, it is necessary to drop a part of the part 2 of a low-priority CSI report, until the bit rate of each CSI part 2 that can be transmitted (or, bit rates of all CSI part 2) is less than the bit rate threshold 2.

It should be noted that, through the advantages of PUSCH with more resources, the above implementation solution uses PUSCH to transmit more CSI reports, thereby solving the problem of simply dropping CSI reports in some cases when multiple CSI reports collide and are transmitted by PUSCH, and then ensuring reliability of network communication.

The above are optional embodiments of the present disclosure. It should be noted that those skilled in the art may make several improvements and modifications without departing from the principles of the present disclosure and these improvements and modifications are covered by the protection scope of the present disclosure.

What is claimed is:

1. A channel state information report transmission method, applied to a terminal, comprising:
    obtaining an allocation rule of a channel state information (CSI) report transmitted on a physical uplink control channel (PUCCH) wherein the allocation rule is configured by a network device or predefined in a protocol;
    when at least two CSI reports collide, multiplexing partial or all of CSI reports with collisions to one first CSI PUCCH selected from configured J first CSI PUCCHs, according to the allocation rule;
    transmitting the partial or all of CSI reports with collisions;
    wherein the multiplexing partial or all of CSI reports with collisions to one first CSI PUCCH selected from configured J first CSI PUCCHs, according to the allocation rule, comprises:
    if one with a smallest resource size that is capable of accommodating the resources required by the at least two CSI reports, is obtained from the configured J first CSI PUCCHs, multiplexing all the at least two CSI reports to the first CSI PUCCH with the smallest resource size;
    if the one with the smallest resource size that is capable of accommodating the resources required by the at least two CSI reports, is not obtained from the configured J first CSI PUCCHs, sequentially multiplexing, according to a first order of the CSI reports, partial of the at least two CSI reports to a first CSI PUCCH with a largest resource size obtained from the configured J first CSI PUCCHs, until the first CSI PUCCH with the largest resource size has been fully occupied,
    wherein the first order is obtained by arranging the at least two CSI reports in descending order according to CSI report priorities.

2. The transmission method according to claim 1, wherein when transmitting the partial or all of CSI reports with collisions, the transmission method further comprises at least one of the following steps:
    when the first CSI PUCCH and a PUCCH carrying hybrid automatic repeat request acknowledgement (HARQ-ACK) collide, transmitting the HARQ-ACK on the first CSI PUCCH;
    when the first CSI PUCCH and a physical uplink shared channel (PUSCH) collide, transmitting CSI reports of the first CSI PUCCH on the PUSCH;
    when the first CSI PUCCH and a sounding reference signal (SRS) collide, determining to transmit the first CSI PUCCH or the SRS, according to information carried by the first CSI PUCCH, periodicity characteristics of the first CSI PUCCH and periodicity characteristics of the SRS.

3. The transmission method according to claim 1, wherein encoding modes of the at least two CSI reports with collisions comprise at least one of the following:

the at least two CSI reports with collisions are separately encoded in the first CSI PUCCH;

first parts of the at least two CSI reports with collisions are jointly encoded, and second parts of the at least two CSI reports with collisions are jointly encoded.

4. A terminal, comprising: a processor, a memory, and a computer program stored on the memory and executable on the processor; wherein the computer program is executed by the processor to obtain an allocation rule of a channel state information (CSI) report transmitted on a physical uplink control channel (PUCCH) wherein the allocation rule is configured by a network device or predefined in a protocol;

when at least two CSI reports collide, multiplex partial or all of CSI reports with collisions to one first CSI PUCCH selected from configured J first CSI PUCCHs, according to the allocation rule;

transmit the partial or all of CSI reports with collisions;

wherein the computer program is further executed by the processor to:

if one with a smallest resource size that is capable of accommodating the resources required by the at least two CSI reports, is obtained from the configured J first CSI PUCCHs, multiplex all the at least two CSI reports to the first CSI PUCCH with the smallest resource size;

if the one with the smallest resource size that is capable of accommodating the resources required by the at least two CSI reports, is not obtained from the configured J first CSI PUCCHs, sequentially multiplex, according to a first order of the CSI reports, partial of the at least two CSI reports to a first CSI PUCCH with a largest resource size obtained from the configured J first CSI PUCCHs, until the first CSI PUCCH with the largest resource size has been fully occupied, wherein the first order is obtained by arranging the at least two CSI reports in descending order according to CSI report priorities.

5. The terminal according to claim 4, wherein when transmitting the partial or all of CSI reports with collisions, the processor is configured to perform at least one of the following:

when the first CSI PUCCH and a PUCCH carrying hybrid automatic repeat request acknowledgement (HARQ-ACK) collide, transmit the HARQ-ACK on the first CSI PUCCH;

when the first CSI PUCCH and a physical uplink shared channel (PUSCH) collide, transmit CSI reports of the first CSI PUCCH on the PUSCH;

when the first CSI PUCCH and a sounding reference signal (SRS) collide, determine to transmit the first CSI PUCCH or the SRS, according to information carried by the first CSI PUCCH, periodicity characteristics of the first CSI PUCCH and periodicity characteristics of the SRS.

6. The terminal according to claim 4, wherein the first CSI PUCCH is used when CSI reports transmitted on PUCCH collide;

when CSI reports transmitted on PUCCH do not collide, the processor is configured to allocate resources occupied by the first CSI PUCCH to physical uplink shared channel (PUSCH), sounding reference signal (SRS), or other PUCCH except for the first CSI PUCCH.

7. A non-transitory computer-readable storage medium, wherein the computer-readable storage medium stores a computer program, and when the computer program is executed by a processor, the following steps are implemented:

obtaining an allocation rule of a channel state information (CSI) report transmitted on a physical uplink control channel (PUCCH) wherein the allocation rule is configured by a network device or predefined in a protocol;

when at least two CSI reports collide, multiplexing partial or all of CSI reports with collisions to one first CSI PUCCH selected from configured J first CSI PUCCHs, according to the allocation rule;

transmitting the partial or all of CSI reports with collisions;

wherein the multiplexing partial or all of CSI reports with collisions to one first CSI PUCCH selected from configured J first CSI PUCCHs, according to the allocation rule, comprises:

if one with a smallest resource size that is capable of accommodating the resources required by the at least two CSI reports, is obtained from the configured J first CSI PUCCHs, multiplexing all the at least two CSI reports to the first CSI PUCCH with the smallest resource size;

if the one with the smallest resource size that is capable of accommodating the resources required by the at least two CSI reports, is not obtained from the configured J first CSI PUCCHs, sequentially multiplexing, according to a first order of the CSI reports, partial of the at least two CSI reports to a first CSI PUCCH with a largest resource size obtained from the configured J first CSI PUCCHs, until the first CSI PUCCH with the largest resource size has been fully occupied, wherein the first order is obtained by arranging the at least two CSI reports in descending order according to CSI report priorities.

8. The non-transitory computer-readable storage medium according to claim 7, wherein when transmitting the partial or all of CSI reports with collisions, and the computer program is executed by the processor, at least one of the following steps are further implemented:

when the first CSI PUCCH and a PUCCH carrying hybrid automatic repeat request acknowledgement (HARQ-ACK) collide, transmitting the HARQ-ACK on the first CSI PUCCH;

when the first CSI PUCCH and a physical uplink shared channel (PUSCH) collide, transmitting CSI reports of the first CSI PUCCH on the PUSCH;

when the first CSI PUCCH and a sounding reference signal (SRS) collide, determining to transmit the first CSI PUCCH or the SRS, according to information carried by the first CSI PUCCH, periodicity characteristics of the first CSI PUCCH and periodicity characteristics of the SRS.

9. The non-transitory computer-readable storage medium according to claim 7, wherein encoding modes of the at least two CSI reports with collisions comprise at least one of the following:

the at least two CSI reports with collisions are separately encoded in the first CSI PUCCH;

first parts of the at least two CSI reports with collisions are jointly encoded, and second parts of the at least two CSI reports with collisions are jointly encoded.

10. The transmission method according to claim 1, wherein when resource sizes of at least two first CSI PUCCHs are different, before multiplexing all the at least two CSI reports to the first CSI PUCCH with the smallest resource size, the transmission method further comprises:

obtaining the first CSI PUCCH with the smallest resource size that is capable of accommodating the resources required by the at least two CSI reports from the configured J first CSI PUCCHs, in such a manner that the resource size of the first CSI PUCCH with the smallest resource size, is greater than the resources required by the at least two CSI reports with collisions and is closest to the resources required by the at least two CSI reports with collisions.

11. The transmission method according to claim 1, the transmission method further comprises using the first CSI PUCCH when CSI reports transmitted on PUCCH collide:
when CSI reports transmitted on PUCCH do not collide, allocating resources occupied by the first CSI PUCCH to physical uplink shared channel (PUSCH), sounding reference signal (SRS), or other PUCCH except for the first CSI PUCCH.

12. The terminal according to claim 4, wherein when resource sizes of at least two first CSI PUCCHs are different, before multiplexing all the at least two CSI reports to the first CSI PUCCH with the smallest resource size, the processor is further configured to:
obtain the first CSI PUCCH with the smallest resource size that is capable of accommodating the resources required by the at least two CSI reports from the configured J first CSI PUCCHs, in such a manner that the resource size of the first CSI PUCCH with the smallest resource size, is greater than the resources required by the at least two CSI reports with collisions and is closest to the resources required by the at least two CSI reports with collisions.

13. The terminal according to claim 4, wherein encoding modes of the at least two CSI reports with collisions comprise at least one of the following:
the at least two CSI reports with collisions are separately encoded in the first CSI PUCCH;
first parts of the at least two CSI reports with collisions are jointly encoded, and second parts of the at least two CSI reports with collisions are jointly encoded.

14. The non-transitory computer-readable storage medium according to claim 7, wherein when resource sizes of at least two first CSI PUCCHs are different, before multiplexing all the at least two CSI reports to the first CSI PUCCH with the smallest resource size, the following steps are further implemented:
obtaining the first CSI PUCCH with the smallest resource size that is capable of accommodating the resources required by the at least two CSI reports from the configured J first CSI PUCCHs, in such a manner that the resource size of the first CSI PUCCH with the smallest resource size, is greater than the resources required by the at least two CSI reports with collisions and is closest to the resources required by the at least two CSI reports with collisions.

15. The non-transitory computer-readable storage medium according to claim 7, wherein the following steps are further implemented: using the first CSI PUCCH when CSI reports transmitted on PUCCH collide:
when CSI reports transmitted on PUCCH do not collide, allocating resources occupied by the first CSI PUCCH to physical uplink shared channel (PUSCH), sounding reference signal (SRS), or other PUCCH except for the first CSI PUCCH.

* * * * *